INVENTOR
ROBERT A. DUNBAR

BY, *Richard E. Hosley*

ATTORNEY

United States Patent Office 3,328,660
Patented June 27, 1967

3,328,660
APPARATUS FOR CONVERTING SINGLE PHASE TO MULTIPHASE ALTERNATING CURRENT
Robert A. Dunbar, Lynn, Mass., assignor to General Electric Company, a corporation of New York
Filed Apr. 14, 1965, Ser. No. 447,999
7 Claims. (Cl. 318—165)

The present invention relates to a power conversion apparatus and more specifically to apparatus for converting single phase to multiphase alternating current.

In many power supplies, as, for instance, flowmeter power supplies, single phase to multiphase current converters are required for driving multiphase synchronous motors necessary in the flowmeter. Presently, the multiphase conversion is accomplished by using a plurality of diodes and a commutator, driven by a D-C motor having a chronometric speed governor. The chronometric speed governor ensures that the commutator is driven at an accurately controlled speed during which period of time a multiphase signal is derived from a single phase source. However, this arrangement requires moving parts in order to operate, and unless critical tolerances are met, the high degree of reliability necessary for continuously accurate flow rate measurement cannot be obtained. As moving parts are subject to wear, and wear is a major factor in determining the reliability of a flowmeter, elimination of any moving parts necessarily results in a greater degree of reliability in a flowmeter. The present invention contemplates the elimination of all moving parts therefrom and replacing them with solid state components. By using solid state components, greater degrees of reliability are achieved which previously were not attainable due to the usage of moving parts.

Therefore, one object of the present invention is to provide a power supply having a high degree of reliability.

Another object of the present invention is to provide a power supply having a high degree of reliability and which is composed entirely of solid state components.

Another object of the present invention is to provide an improved solid state power supply wherein a single phase input curent is converted to a multiphase output current.

Still another object of the present invention is the utilization of silicon controlled rectifiers and silicon controlled switches in a single phase to multiphase current converter wherein a high degree of reliability heretofore unattainable is now attained.

Still another object of the present invention is to provide a solid state power supply which is also a frequency converter as well as a phase converter.

Additional objects and advantages of the present invention will become apparent as the following description proceeds.

Briefly, the present invention includes a pair of parallel connected, controlled switching means for each phase of current to be generated. Each controlled switching means has a control means therefor. An output circuit is serially connected to each pair of parallel connected controlled switching means, and by closing the controlled switching means in a predetermined sequence, current in a desired phase sequence flows in the output circuits. A plurality of controlled switches are connected to the controlled switching means and are sequentially closed. In turn, each controlled switching means is closed only when selected of the sequentially closed controlled switches are closed, and in this manner current in a desired phase sequence flows in the output circuits of the present invention.

For a better understanding of the invention, reference should be made to the following detailed description taken in connection with the accompanying drawings in which.

Figure 1:
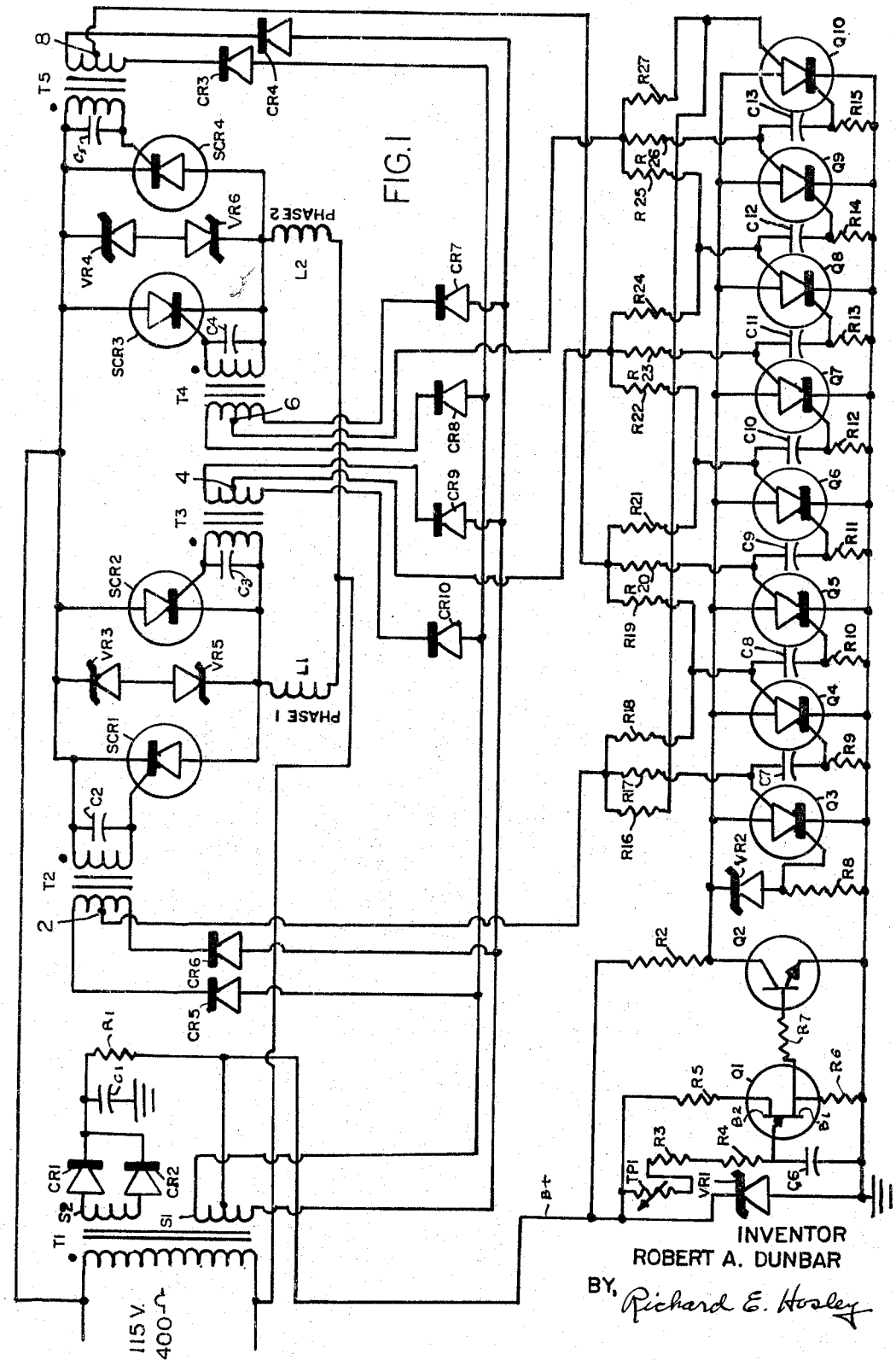
FIGURE 1 is a schematic diagram of an embodiment of the present invention.

Referring now to FIGURE 1 of the drawings, an embodiment of the present invention comprises a means for obtaining a two phase output from a single phase input. For each phase of current to be generated, there is provided a pair of parallel connected controlled switching means. Specifically, two pairs of parallel connected, oppositely poled silicon controlled rectifiers SCR 1 and SCR 2 for phase 1 and SCR 3 and SCR 4 for phase 2, are used with each SCR having a gate electrode. Shunting each pair of parallel connected SCR's are back-to-back voltage-regulating zener diodes. VR3 and V55 for phase 1 and VR4 and VR6 for phase 2, used to protect the SCR's against high voltage transient surges. Serially connected to each of the parallel connected SCR's is an output circuit which, in this instance, comprises phase windings L1 and L2 for a two phase synchronous motor. Alternating current from an external source is applied to the parallel connected SCR's and the synchronous motor winding, and by controlling the conducting state of the SCR's, phase control of the current flowing in the motor winding is obtained.

The means for controlling the conducting state of the SCR's includes a coupling transformer having a secondary winding connected to the gate electrode of each SCR. The primary winding of each coupling transformer is connected through unidirectional impedances to a secondary winding S1 of a power transformer T1 which is excited from alternating current from the external power source. Specifically, the primary winding of coupling transformer T2 is connected through diodes CR5 and CR6 to the secondary S1 of the power transformer T1. Similarly, the primary winding of coupling transformer T3 is connected through diodes CR9 and CR10 to the secondary winding S1 of the power transformer T1; the primary winding of coupling transformer T4 is connected through diodes CR7 and CR8 to the secondary winding S1 of power transformer T1; and the primary winding of coupling transformer T5 is connected through diodes CR3 and CR4 to the secondary winding S1 of the power transformer T1.

Each primary winding of the coupling transformer T2, T3, T4 and T5 has a center tap 2, 4, 6 and 8, respectively, which is connected through associated current-limiting resistors to one or more of a plurality of parallel connected controlled switches. The secondary windings of the coupling transformers T2, T3, T4 and T5 are preferably shunted by capacitors C2, C3, C4 and C5 to prevent transient firing of the SCR's. No current can flow through the primary winding of any coupling transformer unless there is a closed circuit to the center tap of the primary winding because of the unidirectional impedances CR3 through CR10 inserted in series with the primary winding of each of the coupling transformers. No SCR can be triggered into a conducting state unless one of these controlled switches is closed. Therefore, current will not flow through the motor phase windings unless one of the controlled switches is closed. Means is provided for sequentially closing the controlled switches whereby predetermined center tap circuits are closed.

The sequentially closing means comprises a circuit for producing a direct current from the external power source including full wave rectifiers CR1 and CR2, a shunt capacitor filter C1, and a current-limiting series resistor R1. The current-limiting resistor R1 is connected through a series branch consisting of a trim potentiometer TP1, timing resistors R3 and R4, and a timing capacitor C6 to ground. A voltage-regulating zener diode VR1 is connected across the series branch and maintains the voltage thereacross at a constant level. The junction between the resistor R4 and capacitor C6 is connected to the emitter of a unijunction transistor Q1. The base B2 of the unijunction transistor Q1 is connected through a temperature-compensating resistor R5 to the B+ voltage while the base B1 of the unijunction transistor Q1 is connected through a load resistor R6 to ground. Also connected to base B1 of the unijunction transistor Q1 is a bias resistor R7 which, in turn, is connected to the base of an NPN transistor Q2 which transistor is utilized in a grounded emitter circuit. The collector of the transistor Q2 is connected through a current-limiting resistor R2 to the B+ voltage. Generally, charging of the capacitor C6 causes breakdown of the unijunction transistor Q1 which causes saturation of the NPN transistor Q2. The values of the timing resistors R3 and R4 and timing capacitor C6 determine the rate at which unijunction transistor Q1 is rendered conducting and thus the number of times transistor Q2 is saturated. The trim potentiometer TP1 is used for fine adjustment of the time constant for charging the capacitor C6.

The means by which circuits to the center taps on the primary windings of the coupling transformers are connected will now be discussed in detail. Connected between the collector of the transistor Q2 and ground is a second zener diode VR2 and a series connected bias resistor R8. Also connected between the collector of the transistor Q2 and ground are a plurality of controlled switches by which selective gating of the SCR's is accomplished. In this instance, eight silicon controlled switches SCS, Q3 through Q10, respectively, are used and are sequentially gated into conduction. The first SCS Q3 has its cathode gate connected to the junction between the bias resistor R8 and the zener diode VR2. The cathode is grounded and the anode is connected to the collector of the transistor Q2. The anode gate of SCS Q3 is connected through current-limiting resistor R17 to the center tap 2 of coupling transformer T2. The anode gate is also connected to a capacitor C7 which, in turn, is connected to resistor R9 to ground forming an RC timing circuit.

The adjacent SCS Q4 also has its cathode grounded and its anode connected to the collector of transistor Q2. Cathode gate of SCS Q4 is connected to the junction between the timing capacitor C7 and timing resistor R9, and its anode gate is connected through current-limiting resistors R18 and R19 to the center taps 2 and 8 on the primaries of the coupling transformers T2 and T5, respectively. The anode gate of SCS Q4 is connected to capacitor C8 which, in turn, is connected to resistor R10 to ground forming an RC timing circuit.

Similarly, the remaining SCS's Q5 through Q10 are connected to selected of the center taps on the primaries of the coupling transformers through respective load resistors. Specifically, the anode gates of SCS's Q5 and Q6 are connected through current-limiting resistors R20 and R21, respectively, to the center tap 8 of the primary winding of coupling transformer T5; the anode gates of SCS's Q6, Q7 and Q8 are connected through their respective current-limiting resistors R22, R23 and R24 to the center tap 4 of the primary winding of the coupling transformer T3; and the anode gates of SCS's Q8, Q9 and Q10 are connected through their respective current-limiting resistors R25, R26 and R27 to the center tap 6 on the primary winding of coupling transformer T4. Further, the anode gate of SCS Q10 is also connected through current-limiting resistor R16 to the center tap 2 on the primary winding of the coupling transformer T2.

The anode gate of SCS Q5 is connected through a timing capacitor C9 and timing resistor R11 to ground, and the cathode of SCS Q6 is connected through the junction between the capacitor C9 and the resistor R11. In like manner, the anode gate of SCS Q6 is connected to ground through a timing capacitor C10 and timing resistor R12, and the cathode gate of Q7 is connected to the junction of C10 or C12. Similarly, the anode gates of SCS's Q7, Q8 and Q9 are connected to ground through timing capacitors C11, C12 and C13 and timing resistors R13, R14 and R15, respectively. Likewise, the cathode gates of Q8, Q9 and Q10 are connected respectively, to the junctions of the capacitors C11, C12, C13 and resistors R13, R14 and R15, respectively.

Figure 2:
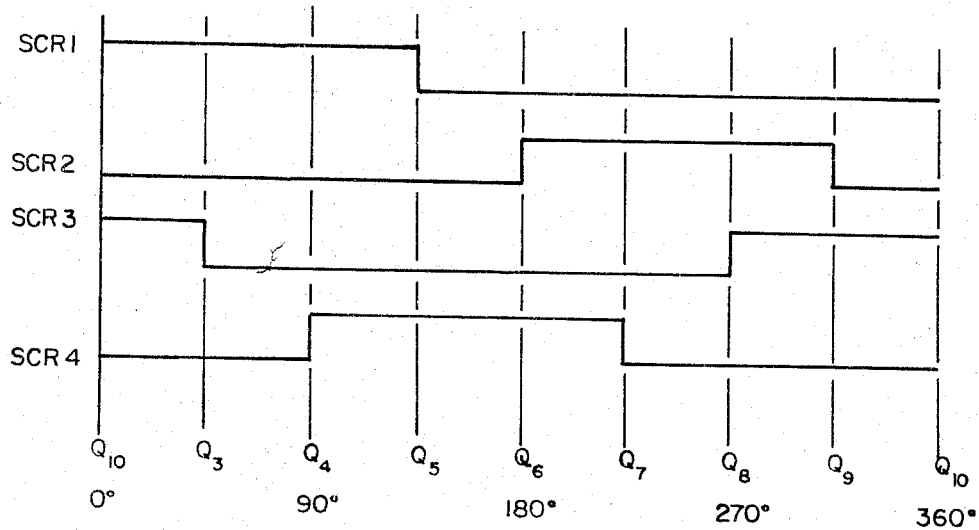
FIGURE 2 is a phase diagram showing the relative time when a circuit is closed to each coupling transformer center tap and thus when it is possible for each SCR to conduct.

From the circuit arrangement it can be seen that when one SCS is conducting, a circuit to at least one of the center taps on the primary windings of one of the coupling transformers will be closed, and it is then possible to gate its associated SCR into conduction whereby current will flow in one of the synchronous motor windings. FIGURE 2 shows at what relative times each SCR may be gated into conduction. In order to have any output current flowing in the synchronous motor windings L1 and L2, at least one SCR must be in a conducting state. In order for an SCR to be gated into conduction, the proper voltage must appear between the anode and cathode of the SCR as well as a voltage sufficient to gate the SCR into conduction appearing on the gate electrode. Alternating current always appears across the parallel connected SCR's in the synchronous motor windings. Thus, if gate voltage of proper polarity is applied to a given SCR, it will conduct. Turning to a discussion of how a proper gate voltage is applied to the gate electrode of an SCR, an alternating current signal is applied to the primary winding of the power transformer T1. A voltage will occur on the SCR gate electrode only when current flows in the primary winding of the coupling transformers. This will occur only when there is a closed circuit from the center tap of the coupling transformers through appropriate current-limiting resistors and through a conducting SCS to ground. As previously mentioned, no current can flow in the primary windings of the coupling transformers due to the series connected diodes.

Figure 3:
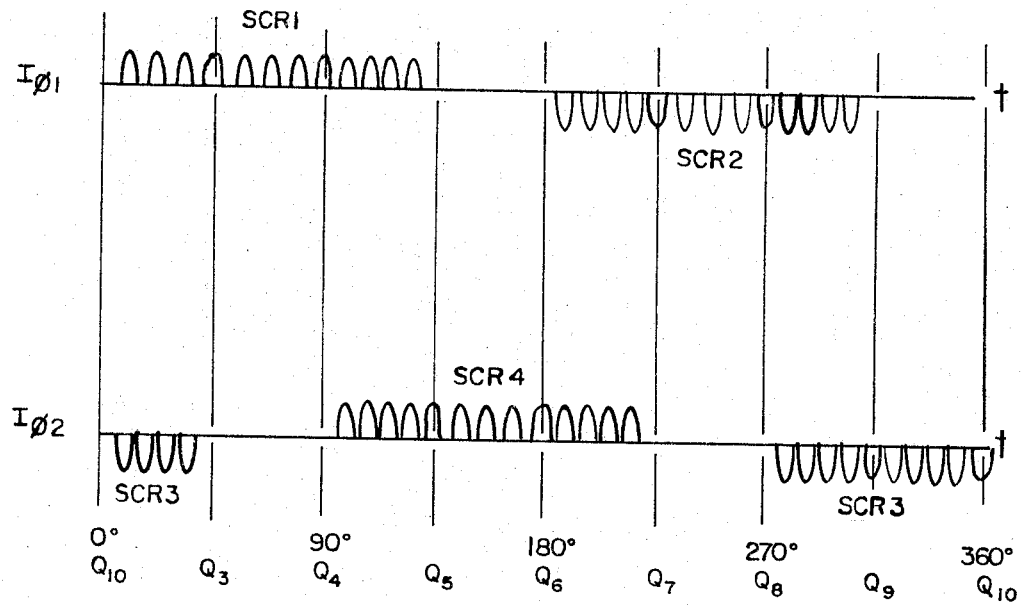
FIGURE 3 is a phase diagram of the output current through the windings of the synchronous motor.

For purposes of explanation, assume that SCS Q3 is conducting. A closed circuit path occurs from the center tap 2 on the primary winding of coupling transformer T2 through current-limiting resistor R17 and through SCS Q3 to ground. On alternate half cycles, a positive voltage pulse will occur on the gate of SCR 1, and simultaneously a negative half-cycle voltage will appear on the cathode of SCR 1. As the two conditions for conduction of an SCR have been met, SCR 1 will be gated into conduction on every half cycle of the source voltage as long as there is a closed circuit passed through the center tap of the primary winding of coupling transformer T2. FIGURE 3 graphically shows the current which flows during the time period when SCS Q3 is conducting. During this time period, D-C from the full wave rectifiers CR1 and CR2 is flowing through the timing resistors R3 and R4 and timing capacitors C6. C6 begins to charge and continues charging until it reaches a voltage level which is sufficient to cause breakdown between the emitter and base B1 of unijunction transistor Q1. When breakdown occurs, a voltage pulse is created across the load resistor R6, and as a result thereof, current flows to bias resistor R7. The anode voltage across a conducting SCS is about 1.5 volts. Q2, which shunts the anodes of each SCS, has a saturated collector voltage of about 0.1 volt. When transistor Q2 becomes saturated, SCS Q3 ceases conducting as its anode becomes effectively current starved, and as sufficient current does not flow through the SCS, it is turned off. Simultaneously, the anode gate of SCS Q3 immediately rises to a potential greater than that of the anode. This occurs because the time constant for the load resistor, the timing capacitor Q7, and timing resistor R9 is greater than the pulse width of the pulse generated by the timer; and as a result thereof, a voltage appears across the timing resistor R9 which is sufficient to gate SCS Q4 into conduction. Referring to FIGURE 3, when SCS Q4 is gated into conduction, current paths to the center taps 2 and 8 on the primary windings of coupling transformers T2 and T5 become closed. Current continues to flow through SCR 1 on the half cycles as previously described, and also current now begins to flow on the identical half cycles through the phase 2 winding of the synchronous motor as SCR 4 is alternately gated into conduction.

Capacitor C6 again begins charging, and upon its again reaching the breakdown level of the unijunction transistor Q1, a second pulse is generated across resistor R6; and by similar operation of the circuitry, SCS Q4 is turned off and SCS Q5 is gated into conduction. As a result thereof, a circuit to the center tap of the primary winding of coupling transformer T2 is no longer closed. Thus, current ceases to flow through the phase 1 winding of the synchronous motor as no voltage can be coupled across the coupling transformer and SCR 1 can no longer be gated into conduction. Current continues to flow through the phase 2 winding of the synchronous motor due to the fact that a circuit to the primary winding of coupling transformer T5 is maintained closed due to SCS 5 being gated to conduction. Again, FIGURE 3 shows that when SCS Q5 is gated into conduction, current ceases to flow in the phase 1 winding while continuing to flow in the phase 2 winding of the synchronous motor.

Subsequent pulses from the unijunction transistor Q1 cause SCS's Q6, Q7, Q8, Q9 and Q10 to be sequentially gated into conduction. From FIGURE 3 it can be seen that current flows to the phase 1 winding of the synchronous motor in a reverse direction when SCS Q6 is gated into conduction and continues to flow until SCS Q9 is gated into conduction. Similarly, reverse current flows in the phase 2 winding of the synchronous motor when Q8 is gated into conduction and continues to flow until SCS Q3 is gated into conduction.

In the preferred embodiment, the time for one complete cycle of the sequentially gated SCS's is in time relationship equal to one revolution of the synchronous motor. Therefore, each SCS will be conducting for 45° of mechanical rotation of the motor and each SCR conducting for a total of 135° of mechanical rotation of the motor as may be seen in FIGURE 2. As the current in phase 1 begins flowing in a positive direction when Q10 is gated into conduction and positive current does not begin to flow in the phase 2 winding until the time when SCS Q4 is gated into conduction, it is seen that the current in the phase 2 winding of the synchronous motor lags the current in the phase 1 winding of the synchronous motor by 90 electrical degrees. Further, for one complete cycle or ring of the SCR switching network, the current flow in each phase winding goes through a positive and a negative cycle. Therefore, one revolution of the motor is equivalent to 360 electrical degrees of output current.

In the preferred embodiment, pulses are produced from the unijunction transistor Q1 at the rate of 48 pulses per second. Therefore, each SCS is gated into conduction six times each second, and as a result thereof, a six cycle two phase current is generated in the phase windings of the synchronous motor.

While I have shown and described a particular embodiment of the present invention, it will be obvious to those skilled in the art that various changes and modifications may be made without departing from the present invention in its broader aspect. Therefore, it is the intention of the appended claims to cover all such changes and modifications as fall within the true spirit and scope of the invention.

What I claim as new and desire to secure by Letters Patent of the United States is:

1. Apparatus for converting single phase alternating current to multiphase alternating current comprising:
   (a) a pair of parallel connected, controlled switching means for each phase of current to be generated, each of said controlled switching means having a control means,
   (b) an output circuit for each phase of current generated, each of said output circuits being connected in series with a corresponding pair of said parallel connected controlled switching means,
   (c) a plurality of controlled switches,
   (d) means connecting predetermined of said controlled switching means to said controlled switches,
   (e) means for sequentially closing said controlled switches, and
   (f) means for closing predetermined of said controlled switching means only when selected of said controlled switches are closed to cause current to flow in said output circuits in a predetermined phase sequence.

2. Apparatus as described in claim 1 wherein said pair of parallel connected, normally open controlled switching means comprises a pair of parallel connected, oppositely poled silicon controlled rectifiers, each silicon controlled rectifier having an anode, a cathode and a gate electrode.

3. Apparatus as described in claim 1 wherein said controlled switches comprise silicon controlled switches each having an anode, a cathode, an anode gate electrode and a cathode gate electrode.

4. Apparatus as described in claim 1 wherein said sequential closing means comprises a timer.

5. Apparatus as described in claim 1 wherein said closing means comprises a transformer for coupling an alternating current signal to the control means of each of said controlled switching means only when selected of said controlled switching means are closed to cause current to flow in said output circuits in a predetermined phase sequence.

6. Apparatus for converting single phase alternating current to multiphase alternating current comprising:
   (a) a pair of parallel connected, oppositely poled silicon controlled rectifiers for each phase of current to be generated, each of said silicon controlled rectifiers having a gate electrode,
   (b) an output circuit for each phase of current generated, each of said output circuits being in series with a corresponding pair of said parallel connected silicon controlled rectifiers,
   (c) means for supplying single phase alternating current to said parallel connected silicon controlled rectifiers and said output circuits,
   (d) a plurality of parallel connected silicon controlled switches each having an anode, an anode gate electrode, a cathode, and a cathode gate electrode,
   (e) means connecting predetermined of said silicon controlled rectifiers to said silicon controlled switches,
   (f) a timing circuit for sequentially gating said silicon controlled switches, and
   (g) transformer means coupling an alternating current signal to the gate electrode of each of said silicon controlled rectifiers only when selected of said silicon controlled switches are conducting to sequentially gate said silicon controlled rectifiers in a predetermined time sequence and cause current to flow in said output circuits in a predetermined phase sequence.

7. Apparatus for converting single phase alternating current to two phase alternating current comprising:
   (a) two pairs of parallel connected, oppositely poled silicon controlled rectifiers, each silicon controlled rectifier having a gate electrode,
   (b) an output circuit in series with each of said pairs of parallel connected silicon controlled rectifiers, each output circuit including one winding of a two phase synchronous motor,
   (c) means for supplying single phase alternating current to said parallel connected silicon controlled rectifiers and said output circuits, (d) four groups of parallel connected silicon controlled switches, each of said groups of silicon controlled switches connected to a respective silicon controlled rectifier, each of said silicon controlled switches including an anode, an anode gate, a cathode, and a cathode gate, (e) transformer means connected between the gate of each silicon controlled rectifier and connected group of silicon controlled switches for coupling an alternating current signal to the gate of said silicon controlled rectifier only when one of said silicon controlled switches in said associated groups of silicon controlled switches is conducting, and (f) a timer for sequentially gating said silicon controlled switches to cause said silicon controlled rectifiers to be gated in a predetermined time sequence and cause current to flow in said synchronous motor windings in a predetermined phase sequence.

References Cited
UNITED STATES PATENTS

| | | | |
|---|---|---|---|
| 1,957,230 | 5/1934 | Sabbah et al. | 321—56 X |
| 1,985,735 | 12/1934 | Macalpine | 321—59 X |
| 2,727,199 | 12/1955 | Ogle | 321—7 X |
| 2,929,011 | 3/1960 | Parsons | 321—56 X |

ORIS L. RADER, *Primary Examiner.*

G. Z. RUBINSON, *Assistant Examiner.*